United States Patent
Criel et al.

(10) Patent No.: US 11,359,766 B2
(45) Date of Patent: Jun. 14, 2022

(54) COMPOSITE PRESSURE VESSEL WITH A MONOLAYER LINER

(71) Applicant: Plastic Omnium Advanced Innovation and Research, Brussels (BE)

(72) Inventors: Bjorn Criel, Sint-Martens-Lennik (BE); Pierre De Keyzer, Brussels (BE)

(73) Assignee: PLASTIC OMNIUM NEW ENERGIES FRANCE, Lyons (FR)

( * ) Notice: Subject to any disclaimer, the term of this patent is extended or adjusted under 35 U.S.C. 154(b) by 0 days.

(21) Appl. No.: 16/339,559

(22) PCT Filed: Oct. 5, 2017

(86) PCT No.: PCT/EP2017/075339
§ 371 (c)(1),
(2) Date: Apr. 4, 2019

(87) PCT Pub. No.: WO2018/065515
PCT Pub. Date: Apr. 12, 2018

(65) Prior Publication Data
US 2019/0242525 A1   Aug. 8, 2019

(30) Foreign Application Priority Data
Oct. 5, 2016 (EP) ..................... 16192469

(51) Int. Cl.
*F17C 1/16* (2006.01)
*B60K 15/03* (2006.01)
(Continued)

(52) U.S. Cl.
CPC ............. *F17C 1/16* (2013.01); *B29C 65/02* (2013.01); *B29C 66/54* (2013.01); *B29C 66/71* (2013.01);
(Continued)

(58) Field of Classification Search
CPC ... F17C 1/16; F17C 1/02; B29C 65/02; B29C 66/54; B29C 66/71; B29C 66/7212; B29C 66/72141
(Continued)

(56) References Cited

U.S. PATENT DOCUMENTS

2005/0288451 A1   12/2005  Liedloff et al.
2006/0108708 A1*  5/2006   Wakita ................... B32B 27/40
                                                       264/248
(Continued)

FOREIGN PATENT DOCUMENTS

CN   1712451    12/2005
CN   102458798   5/2012
(Continued)

OTHER PUBLICATIONS

International Search Report dated Jan. 17, 2018 in PCT/EP2017/075339 filed Oct. 5, 2017.
(Continued)

*Primary Examiner* — J. Gregory Pickett
*Assistant Examiner* — Niki M Eloshway
(74) *Attorney, Agent, or Firm* — Oblon, McClelland, Maier & Neustadt, L.L.P.

(57) ABSTRACT

A composite pressure vessel that includes a monolayer liner and a reinforcing structure arranged on top of the liner. The liner is made by injection moulding and includes at least two shells weldable together. Each shell is made of a polymer composition including at least 45% by weight of an aromatic polyamide relative to the total weight of the polymer composition, and at least 10% by weight of an aliphatic polyamide relative to the total weight of the polymer composition.

9 Claims, 1 Drawing Sheet

(51) Int. Cl.

| | |
|---|---|
| *C08L 77/06* | (2006.01) |
| *F17C 1/06* | (2006.01) |
| *F16J 12/00* | (2006.01) |
| *B32B 27/08* | (2006.01) |
| *B29C 65/00* | (2006.01) |
| *B29C 65/02* | (2006.01) |
| *B32B 27/34* | (2006.01) |
| *B29L 31/00* | (2006.01) |

(52) U.S. Cl.
CPC .... *B29C 66/7212* (2013.01); *B29C 66/72141* (2013.01); *B29C 66/72323* (2013.01); *B29C 66/72326* (2013.01); *B32B 27/08* (2013.01); *B32B 27/34* (2013.01); *B60K 15/03006* (2013.01); *B60K 15/03177* (2013.01); *C08L 77/06* (2013.01); *F16J 12/00* (2013.01); *F17C 1/06* (2013.01); *B29L 2031/7156* (2013.01); *B60K 2015/03046* (2013.01); *B60K 2015/03059* (2013.01); *B60K 2015/03315* (2013.01); *C08L 2205/025* (2013.01); *F17C 2201/0109* (2013.01); *F17C 2201/054* (2013.01); *F17C 2201/056* (2013.01); *F17C 2203/0604* (2013.01); *F17C 2203/066* (2013.01); *F17C 2203/0619* (2013.01); *F17C 2203/0621* (2013.01); *F17C 2203/0624* (2013.01); *F17C 2203/0663* (2013.01); *F17C 2203/0675* (2013.01); *F17C 2209/2118* (2013.01); *F17C 2209/2154* (2013.01); *F17C 2221/012* (2013.01); *F17C 2223/0123* (2013.01); *F17C 2223/036* (2013.01); *F17C 2260/012* (2013.01); *F17C 2260/036* (2013.01); *F17C 2270/0168* (2013.01)

(58) Field of Classification Search
USPC .................................................. 220/589, 586
See application file for complete search history.

(56) References Cited

U.S. PATENT DOCUMENTS

| | | |
|---|---|---|
| 2009/0203845 A1 | 8/2009 | Fukui et al. |
| 2012/0074028 A1 | 3/2012 | Martin et al. |
| 2014/0023808 A1 | 1/2014 | Bzducha et al. |
| 2014/0312043 A1 | 10/2014 | Sejima et al. |
| 2015/0090358 A1 | 4/2015 | Lamontia et al. |
| 2015/0361263 A1* | 12/2015 | Van Der Burgt .......... C08J 5/00 524/133 |
| 2016/0046050 A1* | 2/2016 | Ikeda ................. B23K 26/0093 264/478 |
| 2017/0298225 A1* | 10/2017 | Wang .................. C08G 69/265 |
| 2017/0342269 A1* | 11/2017 | Kikuchi .................. C08L 77/00 |
| 2019/0315225 A1* | 10/2019 | Duez ....................... C08L 77/06 |
| 2020/0247953 A1* | 8/2020 | Duncan .................... B32B 7/10 |

FOREIGN PATENT DOCUMENTS

| | | |
|---|---|---|
| CN | 103619555 | 3/2014 |
| CN | 105593589 | 5/2016 |
| DE | 20 2010 017 414 U1 | 1/2012 |
| EP | 1 241 229 | 9/2002 |
| JP | 2005-7615 A | 1/2005 |
| JP | 2005-298639 A | 10/2005 |
| JP | 2009-263461 | 11/2009 |
| JP | 2015-147318 A | 8/2015 |
| WO | WO 2013/108102 A2 | 7/2013 |
| WO | WO2015197661 | 12/2015 |

OTHER PUBLICATIONS

Mechanical Engineering Material Forming and Application, Beijing: Higher Education Press, Edition: First edition Jul. 2004, p. 333, ISBN 7-04-014686-X. (w/machine English translation).

* cited by examiner

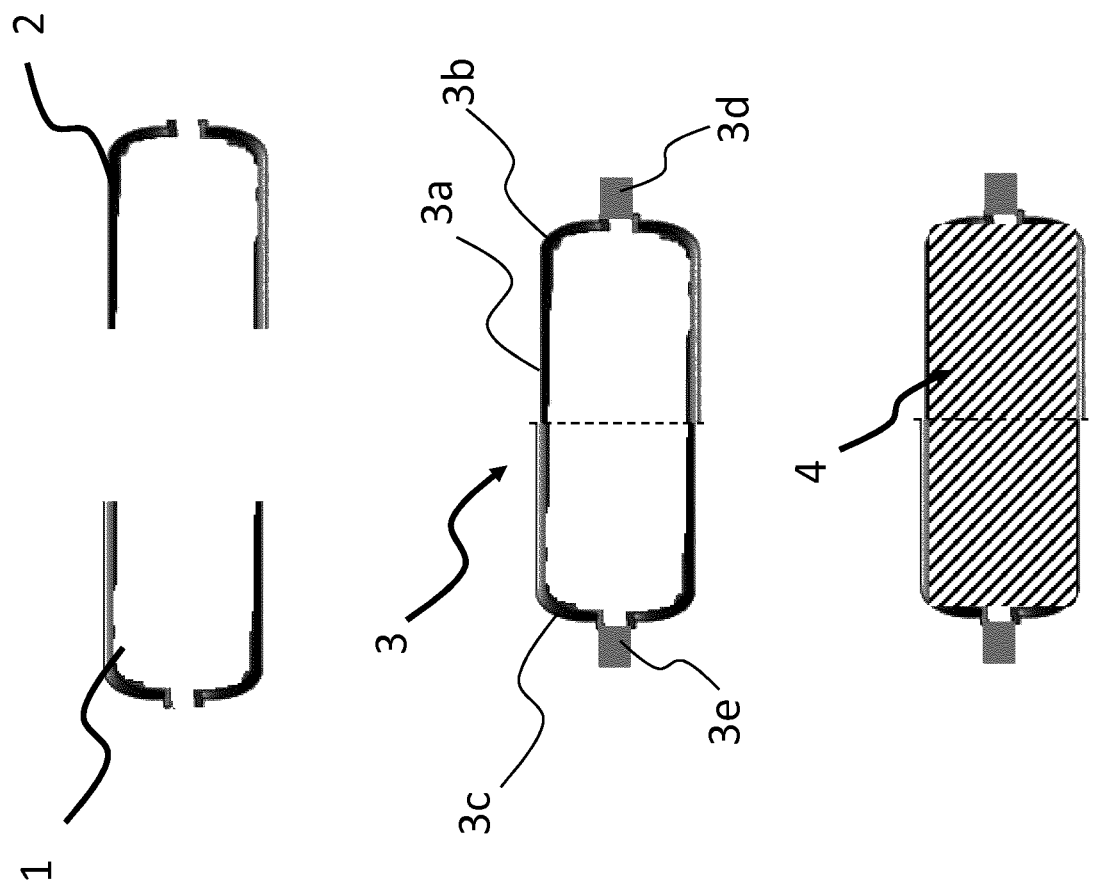

COMPOSITE PRESSURE VESSEL WITH A MONOLAYER LINER

No. PCT/EP2017/075339, filed Oct. 5, 2017, which designates the United States, and claims priority to European Patent Application No. 16192469.1, filed Oct. 5, 2016, and the entire contents of each of the above applications are hereby incorporated herein by reference in entirety.

The present invention relates to a liner for a composite pressure vessel. In particular, it relates to a non-metallic liner for the storage of hydrogen.

Some vehicles use compressed gas as fuel, in particular hydrogen. Generally, such vehicles are equipped with a composite pressure vessel. Generally, the composite pressure vessel comprises a liner for the storage of hydrogen. For example, an outer filament winding is applied around the liner. The filament winding can come in the form of a carbon fiber filament composite wound around the outside of the liner.

Both metallic and non-metallic liners are used, but non-metallic liners are preferred because of their lighter weight.

Non-metallic liners may be of the monolayer type or multilayer type.

Generally, liners of the monolayer type comprise a single layer of polyamide. PA-6 is generally used. A disadvantage of these known liners is that they have an important thickness (typically above 4 mm), in order to meet permeability standards in relation to the type of use for which they are designed and the environmental requirements that they have to satisfy. This increases the weight of the pressure vessel and thus increases the fuel consumption. This also increases the space occupied by the pressure vessel on the vehicle.

Generally, liners of the multilayer type comprise a structure of 6 layers: an inner thermoplastic-based layer, preferably HDPE; a first layer of adhesive; a layer comprising a barrier resin, preferably EVOH; a second layer of adhesive; a layer of regrind; and an outer thermoplastic-based layer. It is known that these known liners suffer from the relatively high diffusivity of hydrogen in the HDPE inner layer (which is in direct contact with the hydrogen). Hydrogen may concentrate in certain areas inside the HDPE inner layer. This accumulation generates bubbles at pressure release. This bubble formation is referred to herein as blistering. This blistering may cause damage in the form of cracking or mechanical degradation of the liner. One additional disadvantage of such structure is its low resistance to the high temperature variations that occur during a refuelling operation. Typically the liner is exposed to a fast temperature variation going from −40° C. up to +80° C. in a few minutes. This generates important amount of thermal stresses in the liner material which can lead to liner break.

WO2013108102 discloses a pressure vessel comprising a rounded container comprising a thermoplastic composition. The thermoplastic composition comprises a siloxane copolymer. The thermoplastic composition further comprises a blend of polyamide. This document does not, however, deal with providing a container having a liner with a low permeability to hydrogen and good blistering resistance. Further, WO2013108102 does not deal with liners being overwrapped with a reinforcing structure.

Other pressure vessels are described in US2009/0203845 and DE20201007414.

In view of the above-mentioned disadvantages, there exists a need for an improved pressure vessel for the storage of hydrogen.

It is, therefore, one aspect of the present invention to provide a composite pressure vessel comprising a monolayer liner, the liner being made by injection moulding, the liner comprising at least two shells weldable together. Advantageously, each shell is made of a polymer composition comprising at least 45% by weight of an aromatic polyamide relative to the total weight of said polymer composition, and at least 10% by weight of an aliphatic polyamide relative to the total weight of said polymer composition.

Thus, it is proposed a monolayer liner made of a polymer blend (i.e. polymer composition) composed of at least 45% by weight of an aromatic polyamide and at least 10% by weight of an aliphatic polyamide relative to the total weight of the polymer composition. The polymer blend of the invention provides for a monolayer liner having reduced thickness, while maintaining low permeability to hydrogen compared to known polyamide-based monolayer liner (i.e. pure PA-6 liner). Further, it provides for a monolayer liner having good mechanical strength for supporting, for example, a filament winding process and without jeopardizing the structure liner integrity after the filament winding process.

It is to note that the chemical proprieties of the polymer blend of the invention allow to slow down the migration (i.e. reduce the diffusion rate) of hydrogen inside the monolayer liner. The polymer blend of the invention provides a diffusion-delay function. Using such diffusion-delay function allows protection of the monolayer liner against the cracking effects due to blistering.

The composite pressure vessel of the invention is capable of storing gases at pressures above 700 bars.

The term "polymer composition" refers to a polymeric material having one or more monomer species, including homopolymers, copolymers, terpolymers, and the like.

The term "polymer composition" also refers to a blend of two or more polymers, and is interchangeable with the term "polymer blend". It is another aspect of the present invention to provide a vehicle comprising a composite pressure vessel as described above.

FIG. 1 illustrates schematically a composite pressure vessel according to a particular embodiment of the present invention and a method for producing such composite pressure vessel.

As illustrated in FIG. 1, two shells 1 and 2 are made separately by injection moulding (or by injection-compression moulding). Since injection moulding process is conventional and well known in the art, it will not be described in any further detail. Such injection moulding process is for example described in document US 20140312043.

Each shell 1 and 2 is made of a polymer composition comprising at least 45% by weight of an aromatic polyamide relative to the total weight of the polymer composition, and at least 10% by weight of an aliphatic polyamide relative to the total weight of the polymer composition. For example, the polymer composition of the present invention is prepared by dry-blending the aromatic polyamide and the aliphatic polyamide in a twin-screw extruder. For example, the aromatic polyamide and the aliphatic polyamide can be dry-blended in a Latech LTE 26-44 twin-screw extruder.

The two shells 1 and 2 are then welded together to form a monolayer liner 3. The liner 3 comprises a cylindrical portion 3a and two dome portions 3b, 3c formed at both ends of the cylindrical portion. A metal mouth piece 3d, 3e may be attached to the top of each dome portion 3b, 3c. It is an advantage of using injection moulding process, since the liner exhibits good dimensional accuracy and the interface between the liner and the metal mouth piece remains tight over time and during durability testing. A higher tightness between the liner and the metal mouth piece can be obtained with:
- a seal with very precise compression between the liner and the metal mouth piece;
- a good surface finish of the liner and the metal mouth piece;
- a good control of the thicknesses of the liner and the metal mouth piece.

For example, a filament winding 4 is arranged on top of the liner 3. The filament winding (carbon or glass fibers) forms a reinforcing structure. Other reinforcing structure may be used. For example, TW (Tape Winding) method can be used. The TW method is a method in which a tape shaped prepreg is wound around the liner. Alternatively, "braiding" method can be used to form a body on the periphery of the liner by braiding a plurality of fibre bundles, and the body is impregnated with resin to be cured.

The polymer composition of the present invention is composed of at least 45% by weight of an aromatic polyamide and at least 10% by weight of an aliphatic polyamide relative to the total weight of the polymer composition.

In the present invention, aromatic polyamides are polymers comprising at least one repeating units of "type 1" having at least one CONH group in the polymer chain and at least one aromatic group. Although not required, such aromatic groups typically originate in a diacid monomer, and include terephthalic acid (TA), isophthalic acid (IPA), phthalic acid, dodecanedioic acid etc. Aromatic residues are characterized by the presence of an aromatic ring, typically with 6 carbons.

In a preferred embodiment, the aromatic polyamide contains at least 30 mole % of aromatic residues in the repeating structural units in the polymer chain.

Non-limitative examples of aromatic polyamides useful for the invention are including polyarylamide MXD6 (grade IXEF commercialized by Solvay) or polyphtalamides (Amodel® grades from Solvay or Zytel® from Dupont or Grivory® HT from EMS).

In the present invention, aliphatic polyamides are polymers comprising at least one repeating units of "type 2" having at least one CONH group in the polymer chain. In addition, Type 2 repeating units are characterized in that 0 mol % thereof comprises an aromatic group. Thus, the maximum content of aromatic group-containing repeating units in an aliphatic polyamide herein is 0 mol % based on 100 mol % repeating units in the polymer. Although not required, such aliphatic groups may originate in a diamine monomer, and include aliphatic diamines comprising 4 to 12 carbon atoms, such as hexamethylene diamine (HMDA), nonane diamine, 2-methyl-1,5 pentadiamine, and 1,4-diaminobutane, etc. One useful diacid source of aliphatic units is adipic acid. Aliphatic polyamides useful in the present invention are aliphatic nylon (e.g. PA6, PA6.6, PA6.12, PA4.6, PA11, PA12, etc.).

The polymer composition of the present invention presents an excellent balance of properties such as hydrogen permeability, mechanical properties and welding performance.

As will be discussed hereafter (see Table 1), the polymer composition of the present invention has a lower hydrogen permeability than a pure PA6 composition. It has also a good resistance to blistering and can resist to the high temperature variations during the refuelling operation, which is characterized in a melt temperature range between 280° C. and 305° C.

Below 45% of aromatic polyamide relative to the total weight of the polymer composition, the polymer composition has unsatisfactory mechanical property.

Below 10% of aliphatic polyamide by weight relative to the total weight of the polymer composition, the polymer composition has unsatisfactory welding performance.

Preferably, the weight ratio between the aromatic polyamide and the aliphatic polyamide is comprised between 1, 4 and 9 and the content of the aliphatic polyamide is greater or equal to 10% and inferior to 35% by weight relative to the total weight of the polymer composition and the content of the aromatic polyamide is greater or equal to 45% by weight relative to the total weight of the polymer composition.

In a particular embodiment, the polymer composition of the present invention comprises from 65 to 90% by weight of aromatic polyamide (measured by NMR spectroscopy as described in PCT/EP2017/069070), and from 10 to 35% by weight of aliphatic polyamide (measured by NMR spectroscopy as described in PCT/EP2017/069070).

Above 90% by weight of aromatic polyamide relative to the total weight of the polymer composition, the polymer composition has lower welding performance (i.e. the burst pressure of a tank obtained by welding of 2 half-shells is below 4 bars).

Above 65% by weight of aromatic polyamide relative to the total weight of the polymer composition, the polymer composition has improved tensile modulus at 60° C. according to ISO527 at 1 mm/min. The tensile modulus obtained is superior to 500 MPa at 65% by weight of aromatic polyamide relative to the total weight of the polymer composition. The deformation of the liner is thus reduced during ageing.

These proportions are measured by NMR spectroscopy and more particularly by $^{13}C$ NMR spectroscopy (as described in PCT/EP2017/069070).

One class of preferred aromatic polyamides is polyphtalamides (PPA). According to the norm ASTM D5336, PPA is an aromatic polyamide in which residues of terephthalic acid or isophthalic acid or a combination of the two comprise at least 55% molar of the dicarboxylic acid portion of the repeating structural units in the polymer chain. PPA comprises more than 55 mole % of the repeating structural units formed by the polycondensation reaction between at least one phthalic acid and at least one aliphatic diamine. The aliphatic diamine can be notably hexamethylenediamine, trimethyl hexamethylene diamine, nonanediamine, 2-methyl-1,5 pentadiamine, and 1,4-diaminobutane, cycloaliphatic diamine.

Polyphtalamides are comprising for instance PA6T, PA6T/6I or PA 6T/6I/66, and mixtures thereof.

Such composition is commercially available.

In a particular embodiment, the aromatic polyamide is a polyphtalamide (PPA).

Other usable class of aromatic polyamides is polyarylamide or PMXDAs, i.e. aromatic polyamides comprising more than 50 mole % of recurring units formed by the polycondensation reaction between at least one aliphatic diacid (such as adipic acid) and metaxylylenediamine. One example of aromatic polyamide based on metaxylylenediamine is PA MXD 6.

The advantages of the polymer composition of the present invention are described in greater detail below by referring to Table 1.

67% of aromatic polyamide (for example, commercially available AMODEL® AT1001L) and 33% aliphatic polyamide (for example, commercially available PA6 Technyl® C548B) were dry-blended in a Latech LTE 26-44 twin-screw extruder to prepare an objective polymer composition pellet. The obtained pellet was injection molded to produce a specimen of 10×10 cm$^2$ having a thickness of 3 mm.

For measuring hydrogen a purge gas method is used. The tests are performed according to ASTM D-3985 and DIN 53380-3 standard.

The tests are performed at 23° C. The temperature is constant during the test.

Hydrogen is detected with an electrochemical sensor.

In particular, a hydrogen leak detector is used to quantify hydrogen leaks. The detection limit is 0.1 ppm (i.e. trace concentration).

The sample is place in a measurement cell and clamped. The surface of the sample exposed to hydrogen permeation is a disc with 60 mm diameter ($2.83*10^{-3}$ m$^2$).

The hydrogen is fed by a gas bottle under pressure (10 bar+−1 bar absolute), with hydrogen high purity of 99.999% and at 0% relative humidity.

In the permeation side, synthetic air (0% relative humidity) is fed by mass flow controller or peristaltic pump. This synthetic air acts as a sweep gas. The flow rate is 15 to 70 ml min$^{-1}$.

The thickness of the samples are 3 mm but other thickness may be used.

Such tests can be performed, for example, by Mecadi GmbH-Chemicals/Processing, Germany, www.mecadi.com.

Hydrogen permeability of the specimen was evaluated. The results obtained are shown in Table 1.

TABLE 1

|  | Density (g · cm−3) | Permeability (cm$^3$ · mm · m$^{-2}$ · d$^{-1}$ · bar$^{-1}$) | Thickness of specimen for permeability testing (mm) |
|---|---|---|---|
| Pure PA6 | 1.05 | 40 | 3 |
| Polymer composition of invention | 1.08 | 31 | 3 |

The lower permeation of the polymer composition of the present invention allows to reduce the total thickness from typically 4 mm (on an injection moulded pure PA6 liner) to 3 mm. The final reduction of the thickness of the liner allows typically to gain 1 L of hydrogen gas storage for a given space on the vehicle and to reduce the weight of the composite pressure vessel by at least 1 kg.

The invention claimed is:

1. A composite pressure vessel comprising a monolayer liner and a reinforcing structure arranged on top of the liner, the liner being made by injection moulding, the liner comprising at least two shells weldable together,
   wherein each shell is made of a polymer composition, wherein the polymer composition for each shell is a blend comprising:
   at least 45% by weight of an aromatic polyamide relative to the total weight of said polymer composition, wherein the aromatic polyamide is a polyphtalamide (PPA), and
   at least 10% by weight of an aliphatic polyamide relative to the total weight of said polymer composition, wherein the maximum content of aromatic group-containing repeating units in an aliphatic polyamide is 0 mol % based on 100 mol % repeating units in the aliphatic polyamide.

2. The composite pressure vessel according to claim 1, wherein said polymer composition comprises from 65 to 90% by weight of aromatic polyamide relative to the total weight of said polymer composition, and from 10 to 35% by weight of aliphatic polyamide relative to the total weight of said polymer composition.

3. The composite pressure vessel according to claim 2, wherein the aliphatic polyamide is selected from a PA6, PA6.6, PA6.12, PA4.6, PA11, and/or PA12.

4. The composite pressure vessel according to claim 1, wherein the aromatic polyamide is selected from PA6T, PA6T/61 and/or PA 6T/61/66.

5. The composite pressure vessel according to claim 1, wherein the aliphatic polyamide is selected from a PA6, PA6.6, PA6.12, PA4.6, PA11, and/or PA12.

6. The composite pressure vessel according to claim 5, wherein the aliphatic polyamide is a PA6 or/and PA6.6.

7. The composite pressure vessel according to claim 1, wherein the reinforcing structure is a filament winding or a tape winding.

8. A vehicle comprising a composite pressure vessel as claimed in claim 1.

9. The composite pressure vessel according to claim 1, weight ratio between the aromatic polyamide and the aliphatic polyamide is comprised between 1.4 and 9.

* * * * *